United States Patent [19]
Norteman

[11] 3,827,139
[45] Aug. 6, 1974

[54] MANUFACTURE OF ELECTRICAL METALLIC TUBING

[75] Inventor: Samuel L. Norteman, Wheeling, W. Va.

[73] Assignee: Wheeling-Pittsburgh Steel Corporation, Pittsburgh, Pa.

[22] Filed: June 23, 1972

[21] Appl. No.: 265,607

[52] U.S. Cl. ............... 29/477.7, 29/527.2, 29/527.4
[51] Int. Cl. ............................................. B23k 31/02
[58] Field of Search ....... 29/504, 527.4, 477, 477.7, 29/487, 527.2, 196.2; 219/59, 67

[56] References Cited
UNITED STATES PATENTS

| | | |
|---|---|---|
| 2,771,669 | 11/1956 | Armstrong et al. ............. 29/527.4 X |
| 2,927,371 | 3/1960 | Hays ............................... 29/527.4 X |
| 3,069,768 | 12/1962 | Caplan et al. ...................... 29/527.4 |
| 3,073,019 | 1/1963 | Caplan et al. ................... 29/527.4 X |
| 3,559,280 | 2/1971 | Mailhiot et al. .................... 29/527.4 |
| 3,700,485 | 10/1972 | Rubin ........................... 29/196.2 X |

*Primary Examiner*—Richard B. Lazarus
*Attorney, Agent, or Firm*—Buell, Blenko & Ziesenheim

[57] ABSTRACT

Electrical metallic tubing is manufactured from galvanized steel strip by forming the strip into tubular shape, welding the edges together and replacing the zinc lost in welding by gas or arc metallizing the weld zone first with aluminum and then with zinc.

7 Claims, 2 Drawing Figures

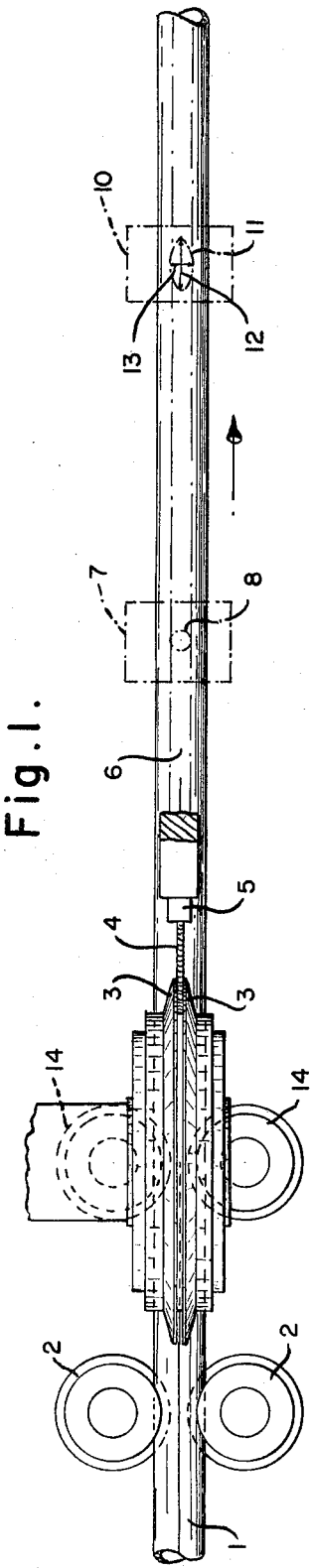
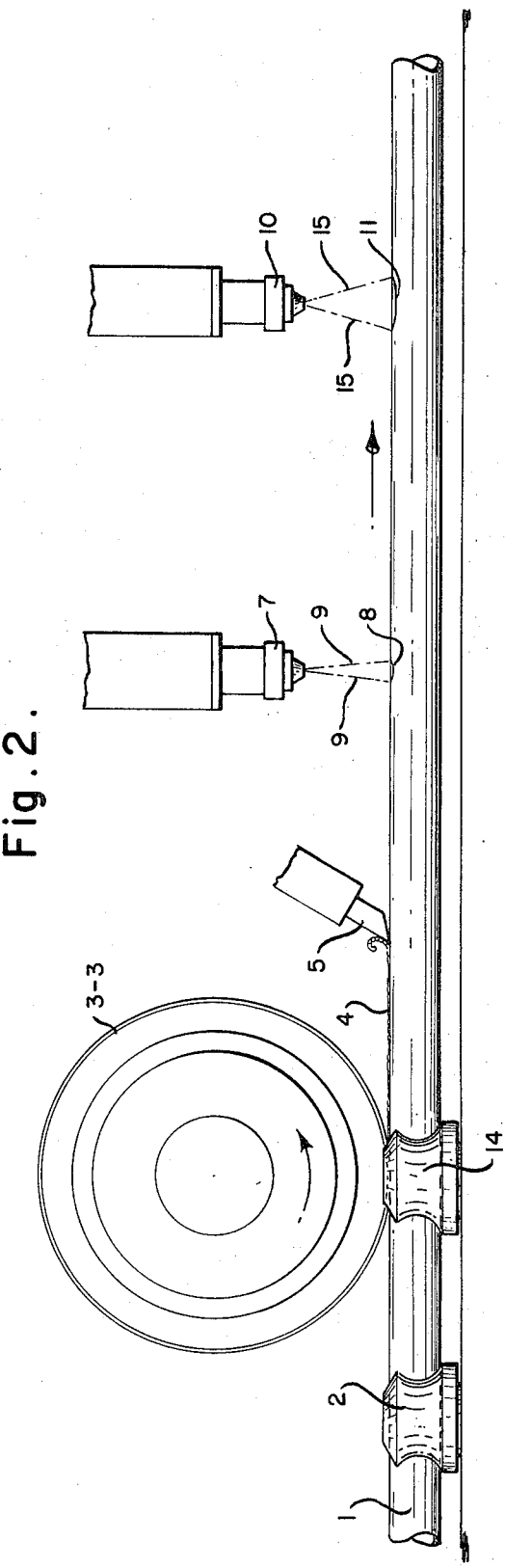
Fig.1.
Fig.2.

MANUFACTURE OF ELECTRICAL METALLIC TUBING

This invention relates to the manufacture of electrical metallic tubing. It is more particularly concerned with a method for manufacturing thin-walled zinc coated electrical metallic tubing, and with the tubing so produced.

Electrical metallic tubing is used for metal raceways for the installation of electrical wires and cables. Large quantities of this tubing are made of steel in size ranges from nominal ⅜ inch to nominal 4 inch diameter. The tubing is relatively thin-walled, having a wall thickness of about 0.042 inch in the smallest sizes and increasing to about 0.083 inch for nominal 4 inch tubing. Steel tubing of this type is conventionally made by forming a flat blank into a tube and welding the edges together. The smaller sizes of electrical metallic tubing are often bent in fabrication and must be able to withstand bending without cracking, rupture or collapse. Tubing of ½ inch nominal or trade size, for example, must be able to withstand bending into a semi-circle the inner edge of which has a radius of 3½ inches.

Steel tubing of this type is commonly protected by a zinc coating. The tubing after forming and welding is conventionally hot dip galvanized or electro-galvanized so that the weld is coated to the same extent as the remainder of the surface. The Underwriters' Laboratories require that the galvanized coating on the exterior of the tubing meet certain thickness standards described hereinafter. These standards do not apply to the coating on the inside of the tube, but that coating must protect the tubing against corrosion. In practice, therefore, the inside surface of the formed tubing is spray or flow coating with an enamel, paint or other acceptable coating.

The coating thickness test specified by the Underwriters' Laboratories is commonly known as the Preece test and is described in detail in the Underwriters' Laboratories standards for electrical metallic tubing, UL 797. Specimens of the zinc coated steel are immersed or dipped in a copper sulfate solution of prescribed strength for sixty seconds and are then removed and washed in running water. The zinc from the specimen displaces copper from the solution, which copper plates out on the specimen. The copper does not adhere strongly to zinc, however, and the loosely adhering deposits are removed by washing in water, followed by wiping the specimen with cheesecloth. The procedure described is then repeated, to an end point described hereinafter. The coating thickness is determined by the number of successive dips which the coating can withstand without dissolving to the steel base. When the zinc is removed down to the iron, which also displaces copper from the solution, the copper adheres firmly to the iron and cannot be washed or rubbed off. The zinc coating of electrical metallic tubing must withstand four such immersions or dips without showing a final firm deposit of copper.

It would be economically advantageous to manufacture electrical metallic tubing with an outside coating of zinc which meets the Underwriters' Laboratories requirements above set out but with an inside coating only thick enough to prevent corrosion, and it is the principal object of my invention to provide such tubing. Another object is to provide a process of manufacturing such tubing. Other objects of my invention will appear in the course of the description thereof which follows.

I have found that electrical metallic tubing can be formed and welded from galvanized steel strip provided with a relatively heavy coating of zinc on the side which forms the outside of the tubing and with a relatively lighter coating of zinc on the side which forms the inside of the tubing. The zinc which is unavoidably melted or volatilized in the weld area by the heat of welding or removed by subsequent scarfing is replaced by gas or arc metallizing in the way hereinafter described. Tubing produced by my process meets all specifications of the Underwriters' Laboratories for electrical metallic tubing.

Economic considerations require that the metallizing be done in line with the continuous forming and welding operation. Previosuly, attempts have been made to do this with zinc, but, to my knowledge, none of these produced zinc coatings that met the Underwriters' Laboratories thickness test. In gas or arc metallizing the coating metal is melted and sprayed, usually by compressed air, onto the surface to be coated. The spraying device, usually called a gun, is fed with coating metal in wire or powder form and after melting it discharges it through a nozzle. As the tubing is formed and welded at speeds in excess of 100 feet per minute, and the width of the area requiring metallizing is quite small, on the order of ¼ inch, the restrictions thus imposed on spray metallizing are severe. In order to meet the Underwriters' Laboratories coating thickness requirements it would appear that a substantial thickness of zinc must be deposited on the substrate, moving at the speeds above mentioned. When it is attempted to deposit a reasonably thick coating of zinc by metal spraying, particularly on a hot substrate such as a welded tube, the heat input tends to cause the deposited zinc to volatilize or sublime. The more zinc is deposited on the metal the more this tendency increases, leading toward an equilibrium condition in which the deposition of more molten zinc results in the volatilization of an equal amount of zinc.

In experiments with which I am familiar it proved impossible, using one gun only, continuously to spray metallize with zinc the weld zone of continuously welded tubing coming from the welder so as to deposit consistently a coating which met the Underwriters' Laboratories test previously described. Processes using two zinc guns in tandem and using three zinc guns in tandem produced no better results. Adjustment of the relative amounts of zinc sprayed by each gun resulted in no improvement. Experiments using two zinc spray guns with a heating stage between them likewise proved unsuccessful. In all cases the coating deposited was quite non-uniform in thickness, and generally very thin in the weld zone where maximum thickness was desired. Experiments were also made with a process in which an aluminum spraying step was interposed between two zinc spraying steps, but again the resulting product was not satisfactory.

It is conventional in metal spraying to spray the metal so that the spray pattern is conical and deposits metal equally along all radii on a plane perpendicular to the axis of the cone. It is desirable to limit the sprayed coating to the area from which the original zinc coating has been burnt off by the welding operation. Overspraying areas of the tubing which have not been heated to a temperature high enough to burn off the zinc coating produces a rough, unsightly coating which tends to flake off when the tubing is bent. The experiments above described were carried out with conventional conical spray pattern nozzles adjusted to spray not substantially beyond the weld area.

I have discovered that steel tubing can be satisfactorily metallized continuously along the weld in line with the tube-forming and welding apparatus by a two-stage process in which zinc is sprayed, at least in the second stage, in a pattern confined substantially to the weld area. I prefer to spray the zinc in a pattern of a flat ellipse, the long axis of which is on the axis of the tubing. Such tubing made from galvanized strip meets all Underwriters' Laboratories standards for electrical metallic tubing. I have also discovered that improved results can be obtained by a two-stage process in which the first stage comprises spraying the tubing with aluminum in a conventional cone shaped pattern and the second stage comprises spraying the aluminum coated tubing with zinc in an elliptical spray pattern as described above.

An arrangement suitable for carrying out my process is schematically illustrated in the attached figures.

FIG. 1 is a plan, and

FIG. 2 is an elevation of apparatus arranged for continuous welding and spray metallizing of tubing.

The tube bending apparatus is not shown as it is ancillary to my process. The tubing 1, bent to shape with its edges abutting, passes from left to right in my figures through a pair of contoured rolls 2—2 which force the edges of the tubing together. Immediately downstream of rolls 2—2 the tubing passes under rotary electrodes 3—3 of a rotary welder, each electrode 3 being positioned to make contact with an edge of tubing 1. The edges of the tubing are welded together by passing current through them from the electrodes 3—3 while the edges are held in contact by a second pair of contoured rolls 14—14, and the welded tubing emerges with an outside flash 4 which is continuously removed by scarfing knife 5. The weld also has an inside flash, as has been mentioned, which is ironed or compressed by ironing means not shown.

The tubing 1 after passing under scarfing knife 5 has a narrow welded zone 6 from which the original zinc coating has been melted off or volatilized in the welding and which has been scraped clean by scarfer knife 5. Downstream from scarfer knife 5 is positioned aluminum metallizing gun 7 directly above the welded zone 6 of the tubing 1 and adjusted to direct a spray of molten aluminum substantially vertically downward onto the tubing 1. The spray pattern of aluminum is circular in plan, as is shown by broken circular line 8, and conical in section, as is shown by broken lines 9—9. The diameter of the spray pattern is approximately the width of weld zone 6.

Zinc metallizing gun 10 is positioned downstream of aluminum metallizing gun 7 directly above the weld zone 6 of tubing 1 and is adjusted to direct a spray of molten zinc substantially downwardly onto the weld zone 6 of tubing 1. The spray pattern of zinc is elliptical in plan, as is shown by the broken elliptical line 11. The major axis 12 of the ellipse is positioned on the weld line and is about three times the length of its minor axis 13. Spray gun 10 is also adjusted so that the minor axis 13 of its spray pattern is approximately the width of weld zone 6. The zinc spray pattern is conical in elevation as is shown in broken lines 15—15. This spray pattern is denominated a fan-shaped spray.

In an embodiment of my invention presently preferred by me, I provide steel strip of the desired gauge with a coating of zinc which is thicker on one side of the strip than on the other. This differential coating, so called, is produced either by hot dip galvanizing or by electro-galvanizing by known methods. The strip width required for tubing is relatively narrow compared to the width of strip which can be galvanized in modern strip galvanizing installation, and as it is more economical to galvanize strip in relatively wide width than in narrow width, I prefer to galvanize strip in widths which are multiples of the strip widths required for tubing and then to slit the strip. The continuously welded, scarfed and spray metallized tubing is then continuously straightened and cut into lengths.

The tandem metal spraying guns are necessarily positioned downstream of the welder and scarfer and should be spaced therefrom a distance sufficient for the weld area of the tube to have cooled somewhat from the fusion temperature reached in welding. Those familiar with the difficulties of measuring the temperature of a narrow zone of an article moving at the speeds here encountered will understand that attempted numerical specification of the temperature would be marginally, if at all, more precise than its estimation by color. The weld zone is heated to white heat or incandesence and cools therefrom through a straw heat to light red to darker red and to black heat. I prefer to spray metallize tubing after it has passed through the light colors but while it is still at black heat, which I judge to be in the range of 500° to 800°F. In one installation with which I am familiar, this is accomplished by positioning the first spray metallizing gun about 10 inches from the scarfer and the second gun about 20 inches from the scarfer.

As I have mentioned, the coating metal is fed to the metallizing spray gun in the form of wire or powder. I prefer to supply the zinc metallizing guns used in my process with zinc in the form of wire of 0.095 inch diameter and operate the gun so as to deposit zinc at the rate of at least about 20 pounds per hour. I prefer to supply the aluminum metallizing gun with aluminum in the form of wire 0.057 inch diameter and operate the guns to deposit aluminum at the rate of at least about 3 pounds per hour. I find that specimens of the product coated by the embodiment of my process comprising spray metallizing with aluminum and then with zinc exhibit minimum coating thicknesses sufficient to satisfy the Underwriters' Laboratories coating test previously mentioned.

It will be understood that welded tubing coming from a mill as I have described is affected by vibration and other disturbances so that it may move closer to or farther away from the spray gun. In such case the width of the area to be covered decreases or increases, respectively. My fan-shaped spray is easily adjusted to compensate for those variations by making the width of the spray equal to the narrowest area to be covered. The spray gun is then rotated about a vertical axis running through its nozzle so that the long axis of the spray pattern is inclined to the tubing axis, thus increasing the width of the area metallized as may be required.

Although I have described and illustrated my process as carried out with resistance welded tubing it is equally applicable to tubing produced by high frequency induction welding.

In the foregoing specification I have described a presently preferred embodiment of this invention, however, it will be understood that this invention can be otherwise embodied within the scope of the following claims.

I claim:

1. The process of manufacturing zinc coated steel tubing from zinc coated steel strip in which the zinc has been applied directly to the steel comprising continuously passing strip sequentially through the following steps:
   a. forming the strip into tubular form and bringing the edges thereof into abutting relation,
   b. welding the edges together and thereby volatilizing zinc from the weld area,
   c. restoring the zinc coating to the weld area by spray metallizing that area in two sequential stages,
   d. the first stage comprising spraying molten aluminum, thereon, and
   e. the second comprising spraying molten zinc thereon,
   f. the coatings applied in steps (d) and (e) providing a coating of substantially the same thickness as the original zinc coating on the steel strip.

2. The process of claim 1 in which step c is carried out after the weld area has cooled to a temperature below the melting point of the coating metal.

3. The process of claim 1 in which the weld area is spray metallized after it has cooled from red heat but while it is at black heat.

4. The process of claim 1 in which the zinc of step (e) is sprayed in a fan-shaped pattern.

5. The process of manufacturing zinc coated steel tubing from zinc coated steel strip in which the zinc has been applied directly to the steel comprising continuously passing the strip sequentially through the following steps:
   a. forming the strip into tubular form and bringing the edges thereof into abutting relation,
   b. welding the edges together and thereby volatilizing zinc from the weld area,
   c. restoring the zinc coating to the weld area by spray metallizing that area in two sequential stages,
   d. the first stage comprising spraying molten zinc thereon, and
   e. the second comprising spraying molten zinc thereon in a pattern of substantially elliptical cross section at the plane of the weld restricted in width to the width of the weld area.

6. The process of claim 5 in which step (c) is carried out after the weld area has cooled to a temperature below the melting point of the coating metal.

7. The process of claim 5 in which step (c) is carried out after the weld area has cooled from a red heat, but while it is at black heat.

* * * * *